United States Patent [19]
Emerson

[11] Patent Number: 5,509,335
[45] Date of Patent: Apr. 23, 1996

[54] CRYOGENIC VAPOR OXYGEN FREE MACHINING METHOD

[75] Inventor: Edwin L. Emerson, Holliston, Mass.

[73] Assignee: Value Tech Engineering, Inc., Holliston, Mass.

[21] Appl. No.: 201,943

[22] Filed: Feb. 25, 1994

[51] Int. Cl.$^6$ .................... B23Q 11/10; B23B 1/00
[52] U.S. Cl. .................... 82/1.11; 82/900; 409/136
[58] Field of Search .................... 82/1.11, 50, 173, 82/900, 173; 83/169; 408/56, 58, 61; 409/136, 137; 451/53, 449, 453, 488

[56] References Cited

U.S. PATENT DOCUMENTS

| | | | |
|---|---|---|---|
| 3,900,975 | 8/1975 | Lightstone et al. | 451/53 |
| 4,641,787 | 2/1987 | Peterson et al. | 241/5 |
| 5,099,729 | 3/1992 | Miyano | 82/900 |
| 5,103,701 | 4/1992 | Lundin et al. | 82/173 |
| 5,203,511 | 4/1993 | Ondush et al. | 241/5 |

*Primary Examiner*—Daniel W. Howell
*Assistant Examiner*—Kenneth J. Hansen
*Attorney, Agent, or Firm*—John E. Toupal; Harold G. Jarcho

[57] ABSTRACT

A machining system including a machine tool having a workpiece holder and at least one cutting tool for machining a workpiece retained by the workpiece holder; a control for automatically controlling the machine tool; a material handling mechanism for loading and unloading workpiece material; and a hermetically sealed chamber enclosing the machine tool and the material handling mechanism. Also included in the system is a source of cryogen and a cryogen distribution network for directing cryogen toward the workpiece retained by the workpiece holder.

5 Claims, 2 Drawing Sheets

CRYOGENIC VAPOR OXYGEN FREE MACHINING METHOD

BACKGROUND OF THE INVENTION

This invention relates generally to an automatic machining system and, more particularly, to an automatic machining system in which machining is performed in an oxygen free environment.

Automatic machine tools have come into extensive use as a result of efforts to reduce manufacturing costs. By rendering machining operations much less labor intensive, automatic machine tools are capable of significantly reducing overall product costs. In efforts to further reduce costs, machining systems have employed coolants for both tools and workpieces. The coolants are used to dissipate frictional heat produced by chips running over the surface of a tool. Operating at lower temperatures permits machining at higher speeds without severely limiting tool life. Highly effective cooling can be provided by cryogens as disclosed in U.S. Pat. Nos. 3,734,412; 4,641,787; 5,103,701 and 5,203,511. However, cryogen machining processes are not widely used because of the high cost of the cryogens themselves.

The object of this invention, therefore, is to provide an improved machining system that will reduce the overall costs of machining operations.

SUMMARY OF THE INVENTION

The invention is a machining system including a machine tool having a workpiece holder and at least one cutting tool for machining a workpiece retained by the workpiece holder; a control for automatically controlling the machine tool; a material handling mechanism for loading and unloading workpiece material; and a hermetically sealed chamber enclosing the machine tool and the material handling mechanism. Also included in the system is a source of cryogen and a cryogen distribution network for directing cryogen toward the workpiece retained by the workpiece holder. Machining efficiency is greatly enhanced by the provision of a hermetically sealed chamber and use of a cryogen as a workpiece coolant.

According to one feature of the invention, the system includes a cryogen containment system and a pump for pumping to the cryogen containment system cryogen released by the distribution network. The provision for cryogen recycling significantly reduces operating cost of the machining system.

According to another feature, the machining system includes a vacuum pump for evacuating the chamber and a source of oxygen free gas communicating with the chamber. The provision for an oxygen free operating environment further reduces cost by preventing oxidation and thereby facilitating the recycling of remnant workpiece material.

According to yet another feature of the invention, the distribution network is arranged to direct cryogen onto a portion of the workpiece in contact with the cutting tool. This feature substantially reduces tool wear.

According to other features of the invention, the system includes a plurality of cutting tools and a motive mechanism for sequentially moving each of the cutting tools into an operative position for cutting the workpiece; and the distribution network includes a discharge nozzle associated with each of the cutting tools, tubing connected to cryogen source, and a coupling for sequentially connecting the tubing to each of the discharge nozzles. Sequential, varied machining operations are facilitated by these features.

According to further features of the invention, the motive mechanism includes a stationary support and a transport retaining the cutting tools movably mounted on the support means; and the discharge nozzles are retained on the transport, and the coupling is retained by the stationary support. These features simplify sequential use of the multiple tools while providing a supply of cryogen.

The invention also encompasses a machining method including the steps of: providing a hermetically sealed environment around a workpiece; directing a cryogen onto the workpiece; and machining the workpiece to produce a finished part therefrom. The use of a cryogen in a sealed environment provides a highly efficient machining process.

According to one feature, the immediately above invention also includes the steps of gathering material removed from the workpiece, combining the material gathered during the gathering step with an additional quantity of the same material, and melting the combined materials. These features provide for efficient recycling of remnant workpiece material.

According to a further feature of the invention, the producing step comprises the steps of providing a vacuum in a volume around the workpiece, introducing into the volume a gas identical to the cryogen, accumulating the cryogen, compressing the accumulated cryogen vapor; and condensing the compressed cryogen vapor to produce a cryogen liquid for reuse. These features facilitate recovery and recycling of the cryogen.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
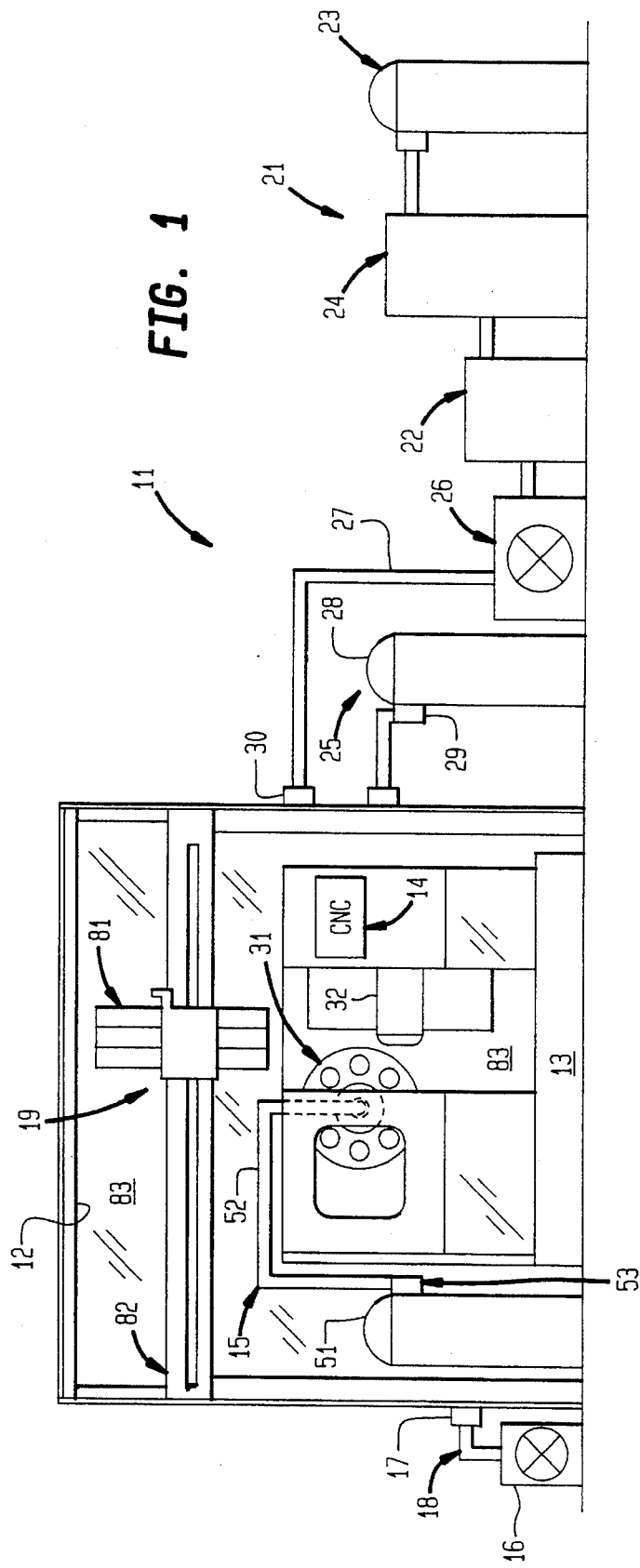
FIG. 1 is a schematic view of an automatic machining system according to the invention.

An automatic machining system 11 is schematically illustrated in FIG. 1. Retained within a transparent, hermetically sealed chamber 12 is an automatic machine tool 13 such as a lathe operated by a computer numerical control 14. Also retained within the chamber 12 are a material handling robot system 19 and a cryogen distribution network 15. Communicating with the chamber 12 is a pumping system including a vacuum pump 16 and a vacuum valve 17 joined by vacuum piping 18.

The machining system 11 also includes a cryogen containment system 21 and an oxygen free gas source 25 disposed externally of the chamber 12. Included in the cryogen containment system 21 is a compressor 22 and a storage tank 23 joined by a condenser 24. The compressor 22 communicates with the enclosure 12 via a pump 26, connecting tubing 27 and a valve 30. Preferably, the oxygen free gas source 25 consists of a tank of nitrogen 28 communicating with the enclosure 12 via a valve 29.

Figure 2:
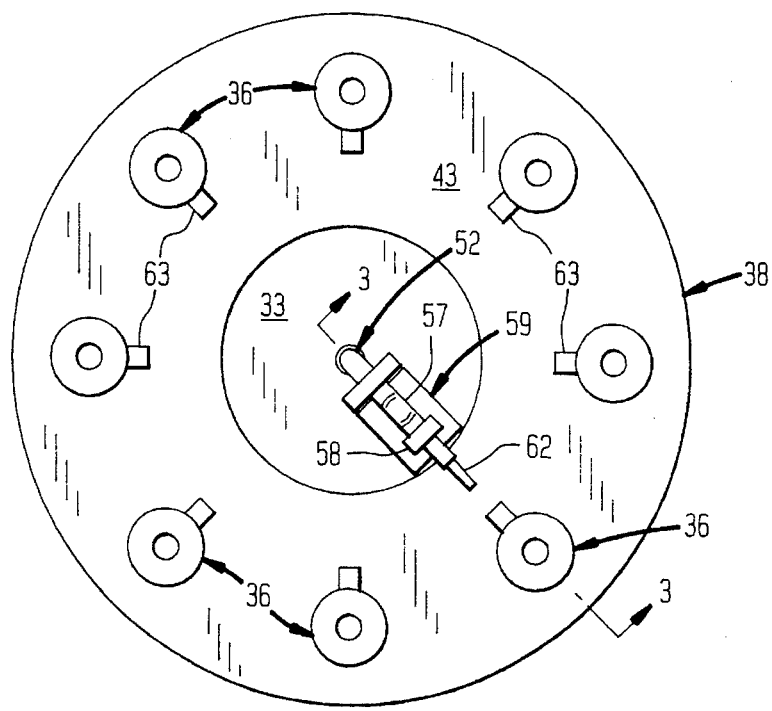
FIG. 2 is a more detailed view of a motive mechanism used in the system of FIG. 1.
Figure 3:
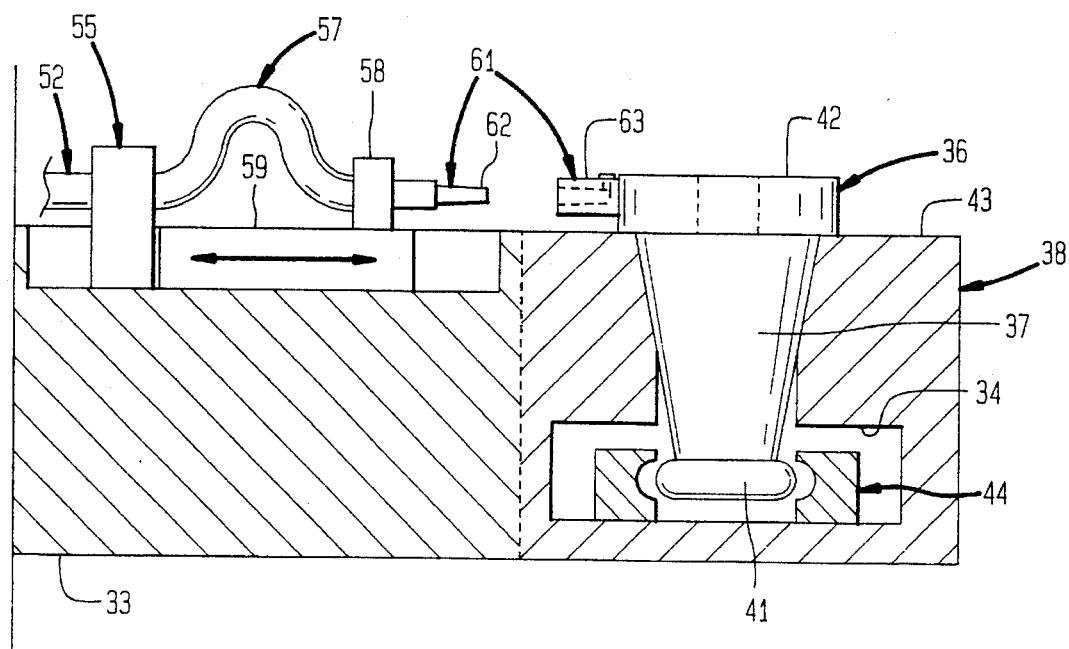
FIG. 3 is a cross-sectional view taken along lines 3—3 of FIG. 2.

The automatic machine tool 13 includes a motive mechanism 31 operated by the computer numerical control 14 to sequentially move predetermined cutting tools into an operative position with respect to a workpiece retained in a workpiece holding chuck 32. As shown in FIGS. 1-3, the motive mechanism has an annular, transport turret 38 rotatably mounted on a stationary central support 33. Formed in the turret 38 are a plurality of circumferentially spaced apart cavities 34, each retaining a tool holder 36. A conically shaped intermediate portion 37 of each tool holder 36 is straddled by an inner flange 41 and an outer flange 42 seated against an outer surface 43 of the turret 38. A clamping mechanism 44 can be actuated to engage and retain the inner flange 41 of each tool holder 36.

As also depicted in FIGS. 1-3, the cryogen distribution network includes a supply tank 51 containing a suitable cryogen such as liquid nitrogen and a flexible hose 52 retained between a control valve 53 on the tank 51 and a clamp 55 on the stationary central support 33 (FIG. 3). An outer end 57 of the tubing hose 52 projecting beyond the clamp 55 is retained by a fixture 58 reciprocable by a pneumatic cylinder 59. Forming a coupling 61 are mating fluid flow accommodating connectors 62, 63 retained, respectively, by the outer end 57 of the hose 52 and each of the flanges 42 on the tool holders 36.

Figure 4:
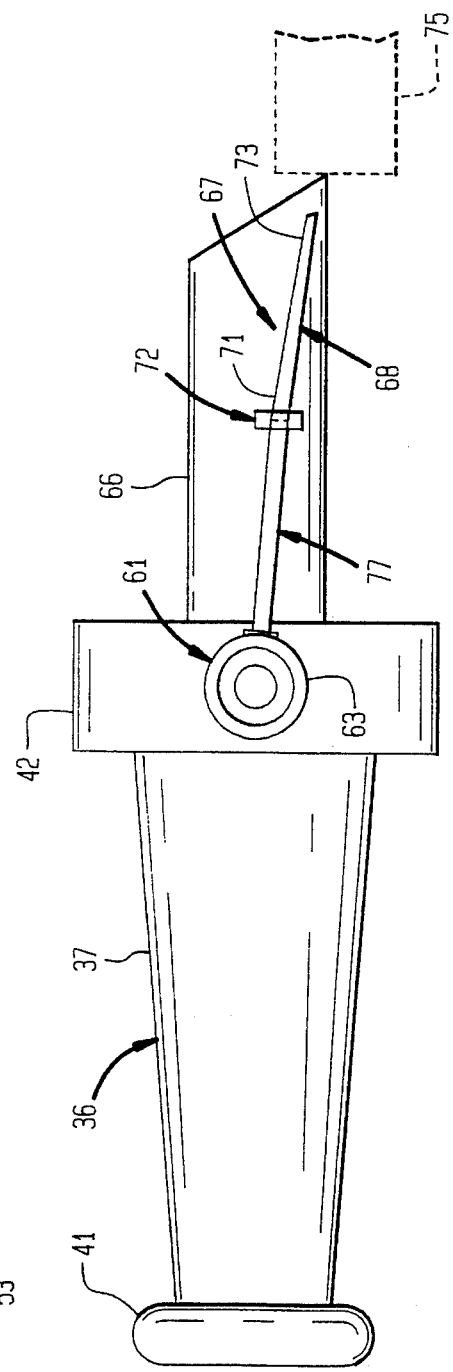
FIG. 4 is a detailed view of a cutting tool and holder retained by the motive mechanism of FIGS. 2 and 3.

After insertion of a desired tool 66 into any of the holders 36, a nozzle assembly 67 is mounted as shown in FIG. 4. Included in the nozzle assembly 67 is a discharge nozzle 68 having an inner end 71 retained by a clamp 72 on the tool 66 and an outer open end 73 directed toward a portion of a workpiece 75 to be engaged by the tool 66. Connecting the inner end 71 of the discharge nozzle 68 to the connector 63 on the flange 42 is a hose 77.

Referring again to FIG. 1, the material handling robot system 19 preferably is of the gantry type including a robot 81 supported on a robot frame 82 that permits multi-dimensional movement of the robot 81. Preferably, the chamber 12 is formed by transparent panels 83 mounted on the robot frame 82 and providing visual access to the machining operations within the enclosure 12. Suitable materials for the transparent panels 83 are Plexiglas or Lexan of a thickness sufficient to withstand vacuum pressure.

OPERATION

Prior to initiating a machining operation, required tools are inserted into the holders 36 of the turret 33 and a suitable supply of workpieces is loaded into the chamber 12 in positions suitable for handling by the robot 81. Next, the vacuum pump 16 is energized and the valve 17 opened to induce evacuation of the chamber 12 to a suitable vacuum pressure. After being evacuated, pressure in the chamber 12 is increased to a suitable level by injection of an oxygen free gas such as nitrogen from the tank 28 through the opened valve 29. Predetermined machining operations then are performed on workpieces retained by the sequentially, robot loaded and unloaded chuck 32 under the control of the computer numerical control 14.

During the machining operations, individual tools in the tool holders 36 are sequentially rotated into operative position with respect to a workpiece retained by the chuck 32. After each tool is moved into operative position, the pneumatic cylinder 59 is actuated to move the connector 62 into engagement with the connector 63 thereby establishing a fluid communication path between the cryogen supply tank 51 and the discharge nozzle 73 mounted on the operative tool 66 (FIG. 4). During a subsequent machining operation, the control 14 opens the valve 53 to produce a flow of liquid cryogen through the distribution network 15 for discharge from the nozzle 73 onto a portion of the workpiece 75 being machined by the tool 66. Because of the oxygen free environment within the enclosure 12, oxidation of workpiece chip material near the tool-workpiece interface is reduced to thereby reduce heat generation. In addition, the discharged cryogen minimizes the effects of heat created by friction at the workpiece-tool interface and by shearing of workpiece material. Accordingly, the system 11 permits machining operations at high speeds and feeds while maintaining low enough temperatures for relative long tool life.

Another advantage of the system 11 is that vaporized liquid nitrogen, in addition to performing as an effective coolant due to its very low boiling point, will not contaminate the workpiece material by adhering to chips that are formed during machining operations. Therefore, the chips can be recycled into melts of virgin material without any requirement for cleaning processes. The actual recycling of the chips from the workpiece material only requires the compaction of the chips into a form suitable to being combined in a melt of virgin material at a ratio equal to the percentage of the material removed in the machining process. Therefore, if the machining process removes 20% of the original stock material then the melt will consist of 80% virgin material and 20% compacted chips by weight. Previous testing has shown this concept can produce melts of purity and quality that are equal to or greater than that of melts of 100% virgin material. Use of the system 11 with materials such as depleted uranium, berylium, titanium, stainless steel, inconel and other nickel based superalloys is efficient, therefore, despite both the high cost of the material and the problems found in machining under standard conditions.

After completion of a given machining run, the pump 26 is energized to draw nitrogen vapor from the enclosure 12 into the compressor 22 via the pipe 27. The compressed vapor is condensed in the condenser 24 and then collected in liquid form by the tank 23. Subsequently, the filled tank 23 can be used as required to replace an empty tank 51 within the enclosure 12 and thereby substantially reduce cryogen cost. Thus, the system 11 both enhances machining performance and facilitates the economic recycling of remnant workpiece material.

Obviously, many modifications and variations of the present invention are possible in light of the above teachings. It is to be understood, therefore, that the invention can be practiced otherwise than as specifically described.

What is claimed is:

1. A machining method comprising the steps of:

providing a hermetically sealed chamber around a workpiece;

evacuating said chamber so as to produce therein a substantially oxygen free environment;

directing a cryogen vapor onto only a limited portion of said workpiece so as to substantially cool only said limited portion thereof; and machining said limited portion of said workpiece to produce a finished part therefrom.

2. A machining method according to claim 1 wherein said workpiece is composed of a given material and including the steps of gathering a portion of said given material removed from said workpiece, combining said material gathered during said gathering step with an additional quantity of said given material, and melting said combined materials.

3. A machining method according to claim 1 and including the step of introducing into said chamber a gas identical to said cryogen vapor.

4. A machining method according to claim 1 including the step of accumulating said cryogen vapor for reuse.

5. A machining method according to claim 4 including the steps of compressing said accumulated cryogen vapor; and condensing said compressed cryogen vapor to produce a cryogen liquid.

* * * * *